US006925963B2

(12) United States Patent
Duffy et al.

(10) Patent No.: US 6,925,963 B2
(45) Date of Patent: *Aug. 9, 2005

(54) PET BLANKET

(75) Inventors: Sean Duffy, County Down (GB);
Lillian Cromie, County Down (GB);
William Blakely, County Down (GB)

(73) Assignee: Norbrook Laboratories Limited, Newry (IE)

(*) Notice: Subject to any disclaimer, the term of this patent is extended or adjusted under 35 U.S.C. 154(b) by 0 days.

This patent is subject to a terminal disclaimer.

(21) Appl. No.: 10/824,699

(22) Filed: Apr. 15, 2004

(65) Prior Publication Data

US 2004/0194730 A1 Oct. 7, 2004

Related U.S. Application Data

(63) Continuation of application No. 10/214,434, filed on Aug. 7, 2002, which is a continuation of application No. PCT/GB01/00431, filed on Feb. 2, 2001.

(30) Foreign Application Priority Data

Feb. 7, 2000 (GB) .............................................. 0002635

(51) Int. Cl.[7] ............................................. A01K 1/015
(52) U.S. Cl. ..................................... 119/650; 119/28.5
(58) Field of Search ................................ 119/650, 28.5, 119/652; 5/482, 485, 486; 54/79.1, 79.2, 79.3, 79.4

(56) References Cited

U.S. PATENT DOCUMENTS

| 2,029,608 A | 2/1936 | Buchman ........................ 5/490 |
| 2,775,222 A | 12/1956 | Kruck ............................. 119/1 |
| 3,284,273 A | 11/1966 | Prentice ......................... 428/76 |
| 3,521,624 A | 7/1970 | Gander et al. ............... 128/849 |

(Continued)

FOREIGN PATENT DOCUMENTS

| GB | 2 189 993 A | 11/1987 | ............ A47G/9/02 |
| GB | 2 211 387 A | 7/1989 | .......... A01K/1/035 |
| JP | 62-267127 | 11/1987 | ........... B29C/67/04 |

Primary Examiner—Yvonne R. Abbott
(74) Attorney, Agent, or Firm—Heslin Rothenberg Farley & Mesiti P.C.

(57) ABSTRACT

A pet blanket providing anti-flea properties is disclosed. The blanket is formed of an upper, permeable layer and a lower, impermeable layer, which together form a closeable pocket for receiving an insert that is impregnated with one or more anti-flea agents. As a pet reclines on the upper, permeable layer, the anti-flea agent(s) diffuse from the insert, through the permeable layer and onto the supine animal.

20 Claims, 2 Drawing Sheets

U.S. PATENT DOCUMENTS

| | | | |
|---|---|---|---|
| 3,626,899 A | 12/1971 | Spellman | 119/169 |
| 3,968,530 A | 7/1976 | Dyson | 5/676 |
| 4,008,687 A | 2/1977 | Keys | 119/482 |
| 4,008,688 A | 2/1977 | Nicholas | 119/1 |
| 4,017,921 A * | 4/1977 | Hernandez | 5/421 |
| 4,169,428 A | 10/1979 | Waugh | 119/482 |
| 4,339,550 A | 7/1982 | Palinczar et al. | 521/99 |
| 4,562,794 A | 1/1986 | Speckman | 119/651 |
| 4,620,849 A | 11/1986 | Corner | 604/290 |
| 4,649,861 A | 3/1987 | Elkins et al. | 119/1 |
| 4,800,677 A | 1/1989 | Mack | 119/171 |
| 4,852,517 A | 8/1989 | Smith et al. | 119/1 |
| 4,913,954 A | 4/1990 | Mack | 428/213 |
| 4,939,017 A | 7/1990 | Foxman | 428/192 |
| 4,961,930 A | 10/1990 | Perdelwitz et al. | 424/411 |
| 5,002,014 A | 3/1991 | Albin | 119/28.5 |
| 5,038,431 A | 8/1991 | Burgin et al. | 5/641 |
| 5,127,367 A | 7/1992 | Starowitz | 119/28.5 |
| 5,144,911 A | 9/1992 | Moore et al. | 119/28.5 |
| 5,152,019 A | 10/1992 | Hirata | 5/655.4 |
| 5,220,884 A | 6/1993 | Townsend | 119/496 |
| 5,233,787 A | 8/1993 | Andersen | 43/132.1 |
| 5,266,324 A | 11/1993 | Stendel et al. | 424/411 |
| 5,320,066 A | 6/1994 | Gunter | 119/28.5 |
| 5,357,901 A | 10/1994 | Batts | 119/28.5 |
| 5,630,376 A | 5/1997 | Ochi et al. | 119/169 |
| 5,662,065 A | 9/1997 | Bandimere et al. | 119/28.5 |
| 5,685,257 A | 11/1997 | Feibus | 119/28.5 |
| 5,784,995 A | 7/1998 | Willinger | 119/28.5 |
| 5,797,347 A | 8/1998 | Ochi | 119/169 |
| 5,970,921 A | 10/1999 | Fulton | 119/858 |
| 5,980,496 A | 11/1999 | Jacobsen et al. | 604/289 |
| 6,156,328 A | 12/2000 | Alcott et al. | 424/405 |
| 6,173,675 B1 | 1/2001 | Licciardo | 119/28.5 |
| 6,189,487 B1 | 2/2001 | Owen et al. | 119/28.5 |
| 6,196,156 B1 | 3/2001 | Denesuk et al. | 119/28.5 |
| 6,378,456 B1 | 4/2002 | Jerome | 119/28.5 |
| 6,408,462 B1 * | 6/2002 | Moore | 5/417 |

* cited by examiner

PET BLANKET

CROSS REFERENCE TO RELATED APPLICATIONS AND CLAIM FOR FOREIGN PRIORITY

This application is a continuation of U.S. patent application Ser. No. 10/214,434, filed Aug. 7, 2002, which is a continuation of International Patent Application Number PCT/GB01/00431, filed Feb. 2, 2001, and claims foreign priority benefits from Great Britain Patent Application Number 0002635.1, filed Feb. 7, 2000. The entire contents of the prior applications is incorporated herein by reference.

FIELD OF THE INVENTION

This invention relates to blankets for animals and in particular, to pet blankets having anti-flea properties.

BACKGROUND OF THE INVENTION

Flea infestation of animals can be both very troublesome to the animals suffering therefrom, as well as to any other animals or humans coming into contact therewith. If flea infestations are left untreated, they can lead to substantial hair loss and irritation of the skin of the affected animal. If particularly prevalent or left untreated for a long period of time, such infestations can lead to anemia or even death of the animal through blood loss and subsequent weakness to the animal caused by the parasitic nature of the fleas.

Treatment of infested animals varies, but generally, they are treated with flea sprays or powders. The disadvantage of this is that the anti-flea product has to be applied in a well ventilated area as the active ingredients can cause irritation to the eyes or respiratory tract of the human applying the product. Furthermore, treatments often have to be repeated each time fleas reappear, and this frequently results in treatment at weekly intervals.

In addition, anti-flea sprays and powders cannot be used on sick and convalescing animals as they could be detrimental to their health. Therefore, it is necessary for such animals to be treated only by a veterinary surgeon which can be very costly to the pet owner. Moreover, in the case of young animals, pregnant and nursing females, in order to prevent adverse effects to the unborn or newly born animals, the fleas should be removed by use of a flea comb.

Furthermore, if the pet is an indoor pet, a flea infestation almost certainly will also lead to infestation of household soft furnishing and carpets. Home infestations must be treated in a manner similar to an animal infestation, whereby the infected furnishings and carpets must be treated with an appropriate insecticide and subsequently thoroughly vacuumed in order to prevent re-infestation. Accordingly, it is easier for the animal owner to try and prevent flea infestations of their pet, as well as their home, rather than having to treat an infestation. In light of this, treatment of the home should be carried out on a routine basis, in order to prevent infestation by fleas carried into the house by their animals. These measures are laborious, time-consuming and expensive, especially where several rooms in the home must be treated.

Other preventative measures include treating the animal's bedding and basket with a suitable insecticide. Application of the insecticide must, of course, be carried out at regular intervals in order to remain effective. The insecticide must also be reapplied each time the bedding is washed. Again, these measures are also very laborious, and many owners will neglect to maintain the appropriate frequency of re-application, thereby reducing the efficacy of the insecticide.

The use of flea collars is another familiar treatment, although these have been shown to have limited success. In cats, for example, flea collars often become slack through use, and, not only may they be removed by the animal, they can cause injury should the animal's front leg become trapped therein. Such injuries might include bums or tears in the skin under the trapped leg. The disadvantages of flea collars are quite common, as many owners neglect to replace the collar at appropriate intervals.

SUMMARY OF THE INVENTION

It is a purpose of the present invention to provide an improved alternative to currently used flea treatments, wherein the invention obviates or mitigates the aforementioned disadvantages and shortcomings of known flea treatments. According to the principles of the present invention, a pet blanket having anti-flea properties is provided.

In one embodiment, the pet blanket comprises two layers of material, constructed so as to form a selectively closeable pocket. While the blanket will most commonly be in the shape of a square or rectangle, any shape may, of course, be used. In addition, while the blanket may also be of any suitable dimensions, the size of the blanket will be dependent upon the size of the pet for which it is being used. Approximate dimensions of a pet blanket for an average canine might be 45 cm by 60 cm, and for an average feline, 45 cm by 45 cm.

A first layer of the blanket is made from a permeable material and the second layer is made from an impermeable material. The blanket further comprises at least one insert for selective insertion into the closeable pocket. The insert is preferably comprised of an absorbent material that has been pre-treated with an emollient ester-based mixture containing at least one anti-flea agent. Preferably, the absorbent material is such that it allows for optimum dispersal of the anti-flea agent(s) throughout the insert. In this manner, when the insert is placed within the pocket, and the animal comes into contact, e.g., lies down on the permeable layer of the blanket, an optimal area of the animal's body will be exposed to the anti-flea activity of the anti-flea agent(s).

DETAILED DESCRIPTION OF THE INVENTION

Accordingly the principles of the present invention provide various embodiments of a pet blanket comprised of two layers of material adapted such that together, they form a closeable pocket which is adapted to receive an insert formed of an absorbent material and that has been treated with one or more anti-flea agents. In the context of this invention, the term "anti-flea agent" is intended to included compounds having flea repellent properties, as well as those that are toxic and fatal to fleas.

Figure 1:
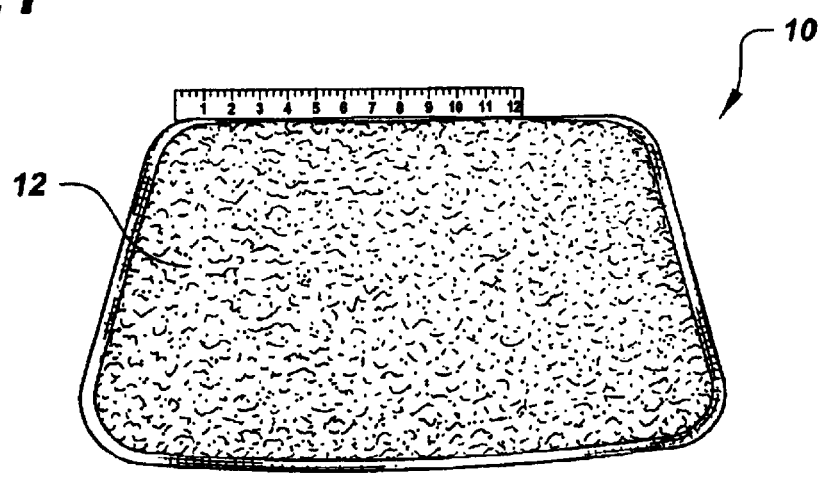
FIG. 1 depicts one example of a pet blanket according to the present invention.

FIG. 1 depicts one example of a pet blanket according to the present invention. The upper layer 12 of the blanket, upon which the animal lies, is made of a permeable material, that is also preferably warm and comfortable for the animal.

Example of suitable materials include, but are not limited to: wool, synthetic wool, fleece or fleece-type materials. The choice of a warm and comforting material will encourage the pet to lie and/or sleep on the pet blanket, and thereby be exposed to the anti-flea treatment.

Figure 2:
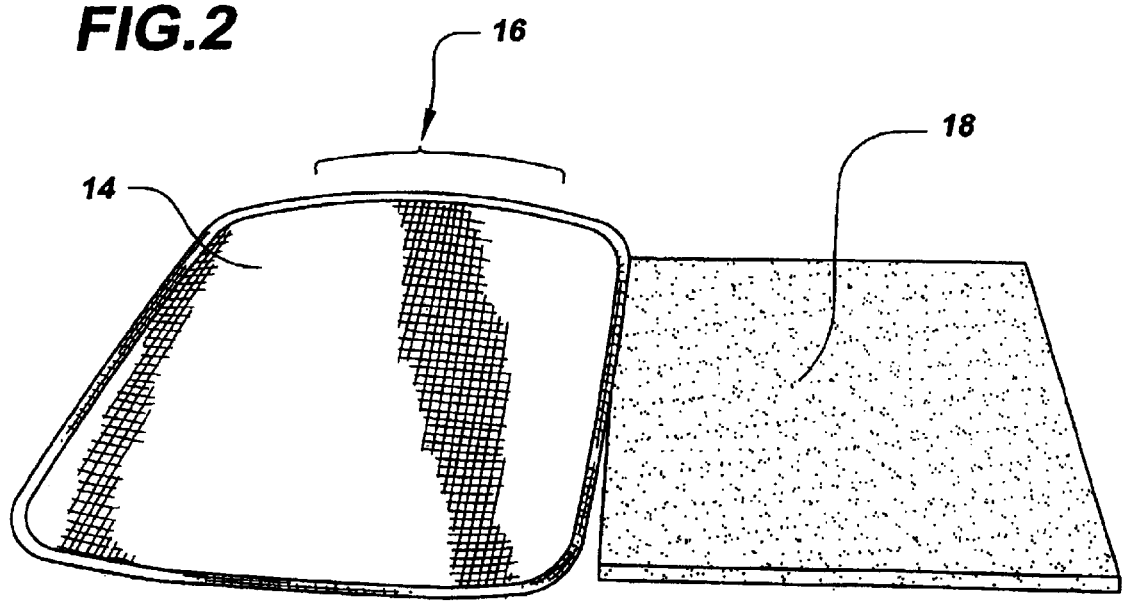
FIG. 2 depicts the other side of the example pet blanket of FIG. 1 together with an example insert according to the present invention.

FIG. 2 depicts the other side of the example pet blanket of FIG. 1 together with an example insert according to the present invention. The lower layer 14 of the blanket, which contacts the floor or basket upon which the blanket lies, is made from an impermeable material, that is preferably waterproof. Such materials might include, for example, plastic laminate or plastic-coated materials such as cotton or nylon. While other appropriate materials will also be easily recognized by the person of skill, a preferred material is polyvinyl chloride (PVC)-coated nylon.

Figure 3:
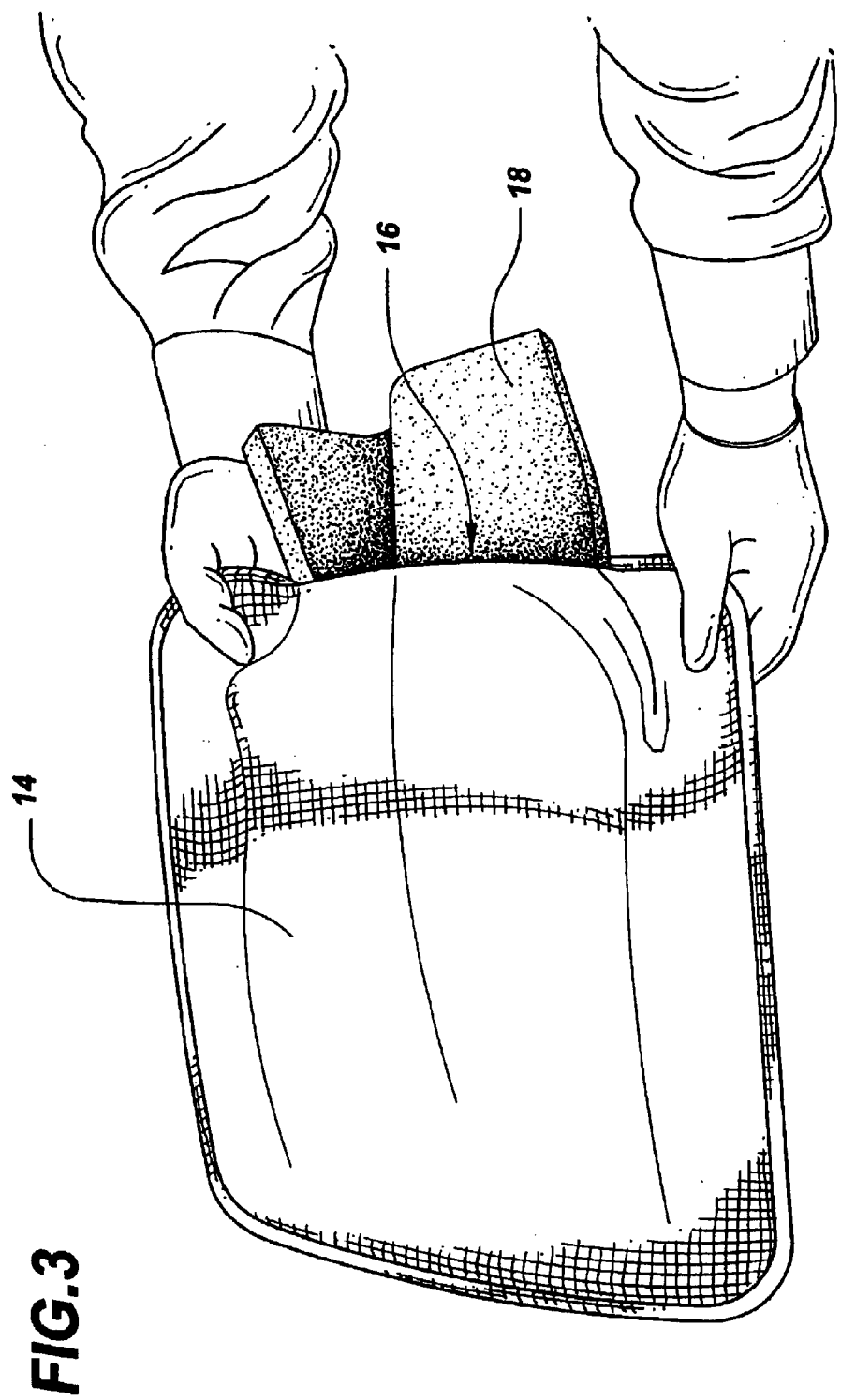
FIG. 3 depicts the insert of FIG. 2 partially placed within the pocket of the pet blanket.

As previously indicated, the upper and lower layers of material are adapted such that together they form a closeable pocket 16. Preferably, the two layers of material will be attached at the full length of their perimeter, but for a portion thereof, such that an opening to the interior pocket is provided. The opening is provided with any appropriate closure, such as, for example, hooks or other fixing means. In addition, the opening is preferably of a dimension slightly smaller than that of the insert, such that the insert should be adapted to flex, in order to pass through the opening into the pocket. See FIG. 3.

With regard to the insert 18, which is preferably constructed to have the same dimensions as the interior of the closeable pocket, it is preferably formed of an absorbent or open-celled material, such that the insert provides a multitude of reservoirs for containing the anti-flea agent(s) within the insert. Suitable materials may include, but are not limited to, an open-cell foam or foam-like material, such as, for example, a polyurethane foam; or an absorbent matting, such as, for example, a natural cellulose or a synthetic polyester mesh.

As previously stated, the dimensions of the insert should be slightly smaller than those of the opening to the pocket, and should be substantially the same as those of the pocket. In this way, the insert may be flexed to pass through the opening and upon full insertion, it will return to its normal or "unflexed" form, and then be unable to readily pass out through the opening without again being flexed and physically removed from the pocket.

As described, the insert will be impregnated with at least one anti-flea agent, although a combination of agents is often preferred. Impregnation of the insert can be carried out by various standard techniques well known to those skilled art.

In a preferred embodiment, impregnation is achieved by mixing the active agent(s) with an emollient ester-based mixture, which is then sprayed onto the insert. Due to the open-celled or absorbent nature of the insert material, dispersal of the active ingredient(s) throughout the insert is achieved.

Suitable anti-flea agents may include, but are not limited to, long or short-acting anti-flea regulators. These agents may comprise insect growth regulators, which act by inhibiting the life cycle of the insect and thereby interrupting proliferation, either alone or in combination with adulticides, which are immediately fatal to the insect. A preferred insect growth regulator is methoprene, Potential anti-flea agents include, but are not limited to: fipronil, lufenuron, imidacloprid, pyriproxyfen, diflubenzuron, teflubenzuron, triflumuron, flufenoxuron, hexaflumuron, buprofezin, pyrethrum, pyrethrin, pyrethroids and carbamates. A preferred combination comprises the agents methoprene and permethrin.

Preferably, the insert system will provide a slow release of the anti-flea agent(s), such that release is dependent upon use of the blanket by the pet. For example, release of the active agent(s) might be activated by the weight of the animal as it reclines on the blanket.

Slow or controlled release of the active agent(s) will provide an increased duration of activity of the anti-flea agent(s). In light of the known activity of common anti-flea agents, it might be anticipated that the insert would be replaced approximately every six months.

During use, i.e., when the animal is reclined on the pet blanket of the present invention, the anti-flea agent(s) diffuse from the insert, through the permeable upper layer of the blanket and onto the animal. Depending upon the nature of the anti-flea agent(s), the flea population will be eradicated immediately in the case of an adulticide, or over a period of time in the case of an insect growth regulator.

Accordingly, one can easily recognize several advantages that are achieved with the pet blanket of the present invention. First, the impregnated insert may be easily removed so that the blanket layers can be washed without diluting the anti-flea effect(s) of the active agent(s). Second, the use of a permeable upper layer allows the active agent(s) to diffuse therethrough, while the use of an impermeable lower layer prevents loss of the agent(s) onto the basket, ground or other surface on which the pet blanket is placed.

Moreover, as the insert is easily removable, the two layered blanket may be reused repeatedly, with a number of inserts. The life of the blanket will be determined by conditions external from the blanket itself, e.g., amount of use or location of use, while the life of the insert will be determined by depletion of the anti-flea agent(s) through the permeable upper layer.

Most importantly, however, the pet blanket of the present invention ensures repeated and routine exposure of the animal to suitable anti-flea agents, as the animal receives a dose of the agent(s) each time it lies down on the blanket.

While the present invention has been described in terms of specific detailed embodiments, it will be appreciated by those skilled in the art that modifications or changes are possible without departing from the spirit of the invention described and taught herein. Such changes and modifications are therefore deemed to be within the scope of the this invention and encompassed by the following claims.

We claim:

1. A pet blanket comprising:
    a first layer of cloth having an outer perimeter;
    a second layer of a non-permeable material having an outer perimeter of substantially the same dimension as that of the first layer, the two layers being attached at their perimeters in a manner that forms a pocket from the first and second layers, and that provides an opening for access into the pocket;
    a removable insert impregnated with one or more anti-flea agents situatable within the pocket; and
    means for closing the opening to the pocket.

2. The pet blanket according to claim 1, wherein the first layer comprises a layer of wool, synthetic wool, fleece or fleece-type material.

3. The pet blanket according to claim 1, wherein the second layer comprises a layer of a waterproof material.

4. The pet blanket according to claim 3, wherein the waterproof material is chosen from a plastic laminate, plastic-coated cotton or plastic-coated nylon.

5. The pet blanket according to claim 4, wherein the waterproof material is polyvinyl chloride-coated nylon.

6. The pet blanket according to claim 1, wherein the insert comprises an material having reservoirs for the one or more anti-flea agents.

7. The pet blanket according to claim 6, wherein the insert comprises an open-cell or absorbent material.

8. The pet blanket according to claim 7, wherein the insert comprises an open-cell foam or foam-like material.

9. The pet blanket according to claim 8, wherein the insert comprises a polyurethane foam.

10. The pet blanket according to claim 7, wherein the insert comprises an absorbent material.

11. The pet blanket according to claim 10, wherein the insert comprises a natural cellulose or a synthetic polyester mesh.

12. The pet blanket according to claim 1, wherein the one or more anti-flea agents comprises a combination of anti-flea agents dispersed in an emollient ester-based mixture.

13. The pet blanket according to claim 12, wherein the combination of anti-flea agents comprises long-acting anti-flea agents, short-acting anti-flea agents or a combination thereof.

14. The pet blanket according to claim 12, wherein the combination of anti-flea agents comprises one or more anti-flea agents having insect growth regulator properties.

15. The pet blanket according to claim 14, wherein the one or more anti-flea agents having insect growth regulator properties comprises methoprene.

16. The pet blanket according to claim 12, wherein the combination of anti-flea agents comprises one or more anti-flea agents having adulticidal properties.

17. The pet blanket according to claim 16, wherein the one or more anti-flea agents having adulticidal properties comprises permethrin.

18. The pet blanket according to claim 12, wherein the combination of anti-flea agents comprises one or more anti-flea agents having insect growth regulator properties and one or more anti-flea agents having adulticidal properties.

19. The pet blanket according to claim 18, wherein the combination of anti-flea agents comprises methoprene and permethrin.

20. The pet blanket according to claim 1, wherein the one or more anti-flea agents comprises one or more of fipronil, lufenuron, imidacloprid, pyriproxyfen, diflubenzuron, telflubenzuron, triflumuron, flufenoxuron, hexaflumuron, buprofezin, pyrethrum, pyrethrin, pyrethroids, carbamates, or any combination thereof.

* * * * *